United States Patent
Evans et al.

(10) Patent No.: US 12,064,930 B2
(45) Date of Patent: Aug. 20, 2024

(54) ULTRAVIOLET CURING APPARATUS

(71) Applicant: Transitions Optical, Ltd., Tuam (IE)

(72) Inventors: Robin Evans, Samut Prakan (TH); Alexander J. Rueberger, Pinellas Park, FL (US); Jared L. Snow, Galway (IE); Lawrence M. Minor, McKinney, TX (US)

(73) Assignee: Transitions Optical, Ltd., Tuam (IE)

( * ) Notice: Subject to any disclaimer, the term of this patent is extended or adjusted under 35 U.S.C. 154(b) by 583 days.

(21) Appl. No.: 17/285,661

(22) PCT Filed: Oct. 16, 2018

(86) PCT No.: PCT/EP2018/078239
§ 371 (c)(1),
(2) Date: Apr. 15, 2021

(87) PCT Pub. No.: WO2020/078538
PCT Pub. Date: Apr. 23, 2020

(65) Prior Publication Data
US 2021/0316520 A1    Oct. 14, 2021

(51) Int. Cl.
*B29D 11/00* (2006.01)
*B05D 3/06* (2006.01)
*B29C 35/08* (2006.01)

(52) U.S. Cl.
CPC ........ *B29D 11/00442* (2013.01); *B05D 3/067* (2013.01); *B29D 11/00423* (2013.01); *B29C 2035/0827* (2013.01); *B29D 11/00865* (2013.01)

(58) Field of Classification Search
CPC ........ B29D 11/00442; B29D 11/00423; B29D 11/00865; B05D 3/067; B29C 2035/0827
USPC ............................................. 34/276
See application file for complete search history.

(56) References Cited

U.S. PATENT DOCUMENTS

| | | |
|---|---|---|
| 3,676,673 A | 7/1972 | Coleman |
| 3,790,801 A | 2/1974 | Coleman |
| 3,807,052 A | 4/1974 | Troue |
| 4,143,468 A | 3/1979 | Novotny et al. |
| 5,135,686 A | 8/1992 | Masuhara et al. |

(Continued)

FOREIGN PATENT DOCUMENTS

| | | |
|---|---|---|
| CN | 204471713 U | 7/2015 |
| CN | 206951459 U | 2/2018 |

(Continued)

*Primary Examiner* — Stephen M Gravini
(74) *Attorney, Agent, or Firm* — The Webb Law Firm (57) ABSTRACT

A curing apparatus (400) includes a housing (402) having a sidewall (404) with an inlet (408) spaced apart from an outlet (410) along an axis, the housing defining an interior chamber (406). At least one opening (419) extends through the sidewall of the housing, for example from the inlet to the outlet. At least one ultraviolet radiation source (426) is operative for transmitting ultraviolet radiation into the interior chamber. At least one nozzle (436) is in flow communication with the interior chamber. The at least one opening is an open slot configured to receive a portion of an article carrier moving along a guideway outside of the housing such that an article supported by the article carrier moves through the interior chamber from the inlet to the outlet on the portion of the article carrier extending through the slot.

15 Claims, 7 Drawing Sheets

(56) References Cited

U.S. PATENT DOCUMENTS

| | | | |
|---|---|---|---|
| 5,713,138 A * | 2/1998 | Rudd | F26B 13/18 |
| | | | 34/540 |
| 5,779,855 A | 7/1998 | Amo et al. | |
| 6,126,095 A | 10/2000 | Matheson et al. | |
| 6,962,003 B2 * | 11/2005 | Takemori | F26B 15/12 |
| | | | 34/74 |
| 7,254,902 B2 * | 8/2007 | Hayasaka | B41F 23/044 |
| | | | 34/620 |
| 7,566,891 B2 | 7/2009 | Rocha-Alvarez et al. | |
| 9,045,822 B2 * | 6/2015 | Kang | C23C 14/12 |
| 10,153,181 B2 * | 12/2018 | Sasaki | H01L 21/67028 |
| 10,730,072 B2 * | 8/2020 | Wang | B05D 3/061 |
| 10,737,431 B2 | 8/2020 | Gillet | |
| 2003/0031746 A1 | 2/2003 | Calvin et al. | |
| 2008/0230721 A1 | 9/2008 | Matsushita et al. | |
| 2015/0079301 A1 * | 3/2015 | Nemani | C23C 18/145 |
| | | | 427/508 |
| 2020/0290279 A1 * | 9/2020 | Sanzari | B29C 64/295 |
| 2021/0122576 A1 | 4/2021 | Jones et al. | |
| 2021/0316520 A1 * | 10/2021 | Evans | B29D 11/00442 |
| 2022/0280970 A1 * | 9/2022 | Springer | B05D 7/536 |

FOREIGN PATENT DOCUMENTS

| | | | | |
|---|---|---|---|---|
| CN | 108117249 A | | 6/2018 | |
| CN | 112867599 A * | | 5/2021 | B05D 3/066 |
| DE | 10157544 A1 | | 6/2003 | |
| DE | 10157554 A1 | | 6/2003 | |
| DE | 102004021696 A1 | | 11/2005 | |
| EP | 415508 A2 | | 3/1991 | |
| EP | 3867048 B1 * | | 3/2023 | B05D 3/066 |
| GB | 2178630 A * | | 2/1987 | B29C 65/14 |
| WO | 2019185132 A1 | | 10/2019 | |
| WO | WO-2020078538 A1 * | | 4/2020 | B05D 3/066 |

\* cited by examiner

ULTRAVIOLET CURING APPARATUS

CROSS-REFERENCE TO RELATED APPLICATION

This application is the United States national phase of International Application No. PCT/EP2018/078239 filed Oct. 16, 2018, the disclosure of which is hereby incorporated by reference in its entirety.

BACKGROUND OF THE INVENTION

Field of the Invention

The present invention relates to an ultraviolet curing apparatus for curing a coating of a coated article. In particular, the present invention relates to an ultraviolet curing apparatus configured for use with a production line having a guideway positioned outside of a housing of the ultraviolet curing apparatus. A method of curing a coated article using an ultraviolet curing apparatus is also disclosed.

Description of the Related Art

With optical articles, such as lenses, one or more surfaces may be subjected to a treatment to enhance the overall performance and function of the optical articles. Examples of such treatments include the formation of one or more coatings on a surface of an optical substrate.

In order to manufacture a coated optical article from an uncoated optical substrate, a variety of manufacturing techniques have been developed. In some processes, an uncoated optical substrate is first washed and dried, after which a coating is applied on at least one surface of the substrate. With coatings that require curing with ultraviolet light, the coated substrate is passed through a curing device having an ultraviolet radiation source. In large scale operations, optical substrates may be processed on an automated production line. Such a production line may have a plurality of processing stations for performing the various operations, including washing, drying, coating, and curing. In some examples, each optical article may be loaded onto a transport vehicle that moves the optical article to various processing stations on the production line.

It would be desirable to develop a new ultraviolet curing apparatus for curing coated optical substrates supported on transport vehicles of an article transport system used in a production line.

SUMMARY OF THE INVENTION

In accordance with the present invention, there may be provided a curing apparatus including a housing having a sidewall with an inlet spaced apart from an outlet along an axis, the housing defining an interior chamber. The housing may have at least one opening extending through the sidewall. For example, the opening may extend from the inlet to the outlet. At least one ultraviolet radiation source may be operative for transmitting ultraviolet radiation into the interior chamber, and at least one nozzle in flow communication with the interior chamber. The axis may be a longitudinal axis.

In accordance with the present invention, the at least one flow nozzle may be connected to a source of inert gas and is configured to inject inert gas into the interior chamber. The at least one opening may be a slot configured to receive a portion of an article carrier moving along a guideway outside of the housing such that an article supported by the article carrier moves through the interior chamber on the portion of the article carrier extending through the slot. A deflectable barrier may extend across the slot between the inlet and the outlet. The deflectable barrier may be deflectable by the portion of the article carrier extending through the slot. The deflectable barrier may be a cloth curtain.

In accordance with the present invention, the inlet may have an inlet sub-chamber defined between a first inlet gate and a second inlet gate spaced apart from the first inlet gate in a direction along the axis. The first inlet gate and the second inlet gate may enclose the inlet of the housing. The first inlet gate and the second inlet gate may be sequentially operated from a closed position to an open position during movement of the article through the inlet. The second inlet gate may be movable to the open position when the first inlet gate is in the closed position.

In accordance with the present invention, the outlet may have an outlet sub-chamber defined between a first outlet gate and a second outlet gate spaced apart from the first outlet gate in a direction along the axis. The first outlet gate and the second outlet gate may enclose the outlet of the housing. The first outlet gate and the second outlet gate may be sequentially operated from a closed position to an open position during movement of the article through the outlet. The second outlet gate may be movable to the open position when the first outlet gate is in the closed position.

In accordance with the present invention, a filter may be positioned between the at least one ultraviolet radiation source and the interior chamber. The filter may be mounted within a frame positioned in an opening extending through the sidewall of the housing. The interior chamber may be air-tight at an interface between the frame and the sidewall of the housing. The at least one nozzle may have an adjustment mechanism for adjusting a flow rate of inert gas into the interior chamber. At least one diffuser plate may be disposed between the at least one nozzle and the interior chamber. The at least one diffuser plate may have a plurality of gas-permeable openings configured for diffusing inert gas into the interior chamber.

In accordance with the present invention, a heat exchanger may be configured for heating or cooling at least one of the housing, the inert gas within the interior chamber of the housing, or the inert gas flowing from the at least one nozzle. At least one reflective element may be provided within the interior chamber. The at least one reflective element may have an angled reflective surface configured for reflecting at least a portion of the ultraviolet radiation from the at least one ultraviolet radiation source toward a lateral side of the article.

In accordance with the present invention, a method of curing a coated article using a curing apparatus may include transporting the article on an article carrier movable along a guideway adjacent to the curing apparatus, moving the article through an interior chamber of the curing apparatus in a direction from an inlet toward an outlet of the curing apparatus, and exposing at least a portion of the article to ultraviolet radiation during movement of the article through the interior chamber. During movement of the article through the interior chamber, a portion of the article carrier supporting the article may move through at least one opening extending through a housing of the curing apparatus. For example, the opening may extend between the inlet and the outlet.

In accordance with the present invention, the method may further include enclosing the at least one opening with a deflectable barrier such that the deflectable barrier is deflectable by the portion of the article carrier during movement of the article through the interior chamber. The method may further include injecting inert gas into the interior chamber from at least one nozzle and diffusing the inert gas through a diffuser plate during injecting of the inert gas into the interior chamber. The method may further include moving the article through an inlet sub-chamber prior to moving the article through the inlet. The inlet sub-chamber may be defined between a first inlet gate and a second inlet gate spaced apart from the first inlet gate and enclosing the inlet. The first inlet gate and the second inlet gate may be sequentially operated from a closed position to an open position during movement of the article through the inlet sub-chamber to prevent introduction of ambient air into the interior chamber through the inlet.

In accordance with the present invention, the method may further include moving the article through an outlet sub-chamber prior to moving the article through the outlet. The outlet sub-chamber may be defined between a first outlet gate and a second outlet gate spaced apart from the first outlet gate and enclosing the outlet. The first outlet gate and the second outlet gate may be sequentially operated from a closed position to an open position during movement of the article through the outlet sub-chamber to prevent introduction of ambient air into the interior chamber through the outlet. The method may further include filtering the ultraviolet radiation prior to exposing at least a portion of the article to the ultraviolet radiation. The method may further include reflecting at least a portion of the ultraviolet radiation toward a lateral side of the article using at least one reflective element.

The features that characterize the present invention are pointed out with particularity in the claims, which are annexed to and form a part of this disclosure. These and other features of the invention, its operating advantages, and the specific objects obtained by its use will be more fully understood from the following detailed description in which non-limiting examples of the invention are illustrated and described.

BRIEF DESCRIPTION OF THE DRAWINGS

In FIGS. 1-8C, like characters refer to the same components and elements, as the case may be, unless otherwise stated.

DETAILED DESCRIPTION OF THE INVENTION

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

The term "not greater than" is synonymous with "less than or equal to".

As used herein, "at least one of" is synonymous with "one or more of". For example, the phrase "at least one of A, B, or C" means any one of A, B, or C, or any combination of any two or more of A, B, or C. For example, "at least one of A, B, or C" includes A alone; or B alone; or C alone; or A and B; or A and C; or B and C; or all of A, B, and C.

The term "adjacent" means proximate to but not in direct contact with.

The term "includes" is synonymous with "comprises".

As used herein, the terms "parallel" or "substantially parallel" mean a relative angle as between two objects (if extended to theoretical intersection), such as elongated objects and including reference lines, that is from 0° to 5°, or from 0° to 3°, or from 0° to 2°, or from 0° to 1°, or from 0° to 0.5°, or from 0° to 0.25°, or from 0° to 0.1°, inclusive of the recited values.

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The term "optical" means pertaining to or associated with light and/or vision. For example, an optical element, article, or device can be chosen from ophthalmic elements, articles, and devices; display elements, articles, and devices; visors; windows; and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "transparent", such as used in connection with a substrate, film, material, and/or coating, means that the indicated substrate, film, material, and/or coating has the property of transmitting visible light without appreciable scattering so that objects lying beyond are visibly observable.

As used herein, the terms "ultraviolet", "UV", "ultraviolet light", or "ultraviolet radiation" mean electromagnetic radiation having a wavelength in the range of 10 nm to 400 nm.

As used herein, the term "coating" means a supported film derived from a flowable coating material, which can optionally have a uniform thickness, and specifically excludes polymeric sheets. The terms "layer" and "film" each encompass both coatings (such as a coating layer or a coating film) and sheets, and a layer can include a combination of separate layers, including sub-layers and/or over-layers. The verb "coating" means, within appropriate context, the process of applying a coating material (or materials) to the substrate to form a coating (or coating layer).

As used herein, the terms "cure", "cured", and related terms, mean that at least a portion of the polymerizable and/or crosslinkable components that form a curable composition are at least partially polymerized and/or cross-linked. In accordance with some examples, the degree of crosslinking can range from 5% to 100% of complete crosslinking. In accordance with some further examples, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of the following examples of the invention, in any combination. Various examples of the invention may be discussed separately. However, it is to be understood that this is simply for ease of illustration and discussion. In the practice of the invention, one or more aspects of the invention described in one example can be combined with one or more aspects of the invention described in one or more of the other examples.

Figure 1:
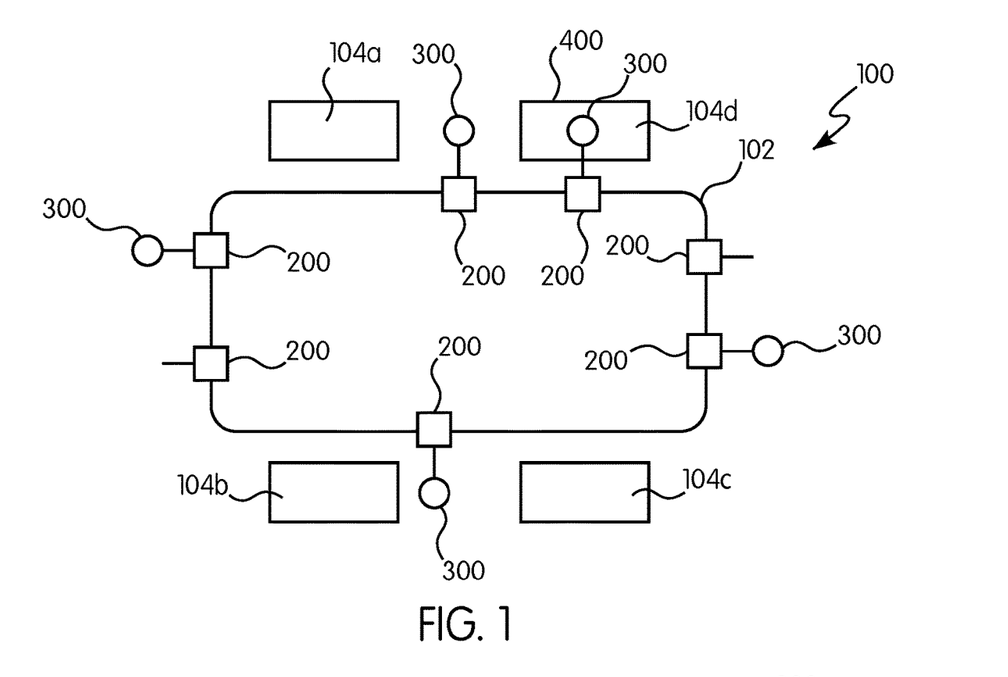
FIG. 1 is a schematic representation of an optical article production line in accordance with some examples of the present invention.

With initial reference to FIG. 1, a production line 100 has a guideway 102 configured for supporting at least one optical article transport vehicle 200 (hereinafter referred to as "transport vehicle 200" or "article support"). Each transport vehicle 200 is configured to transport an optical article 300 between different processing stations of the production line 100. The production line 100 of the present invention can, with some examples, be used for the production of optical articles, such as lenses. Examples of optical articles that can be processed on the production line 100 of the present invention include, but are not limited to, optical lenses, ophthalmic lenses, and/or prescription lenses, which in each case can be finished lenses, unfinished lenses, or lens blanks. In some examples, the production line 100 of the present invention can be at least partially automated and optionally incorporated into art-recognized product tracking and control systems.

The guideway 102 may have a closed loop configuration or an open configuration. In a closed loop configuration, such as shown in FIG. 1, each transport vehicle 200 is movable in an infinite loop, while an open configuration (not shown) requires loading each transport vehicle 200 at a first end of the production line 100 and unloading each transport vehicle 200 at a second end of the production line 100. In some examples, the guideway 102 may be a moving belt, track, or other moving mechanism. A position of the transport vehicle 200 may be fixed on the moving guideway 102. Alternatively, the transport vehicle 200 may be movable along a stationary guideway 102. Each transport vehicle 200 may be configured for uni-directional or bi-directional movement along the guideway 102. In some examples, the guideway 102 may be a magnetic guideway available from MagneMotion (Rockwell Automation) of Devens, Massachusetts.

Figure 2:
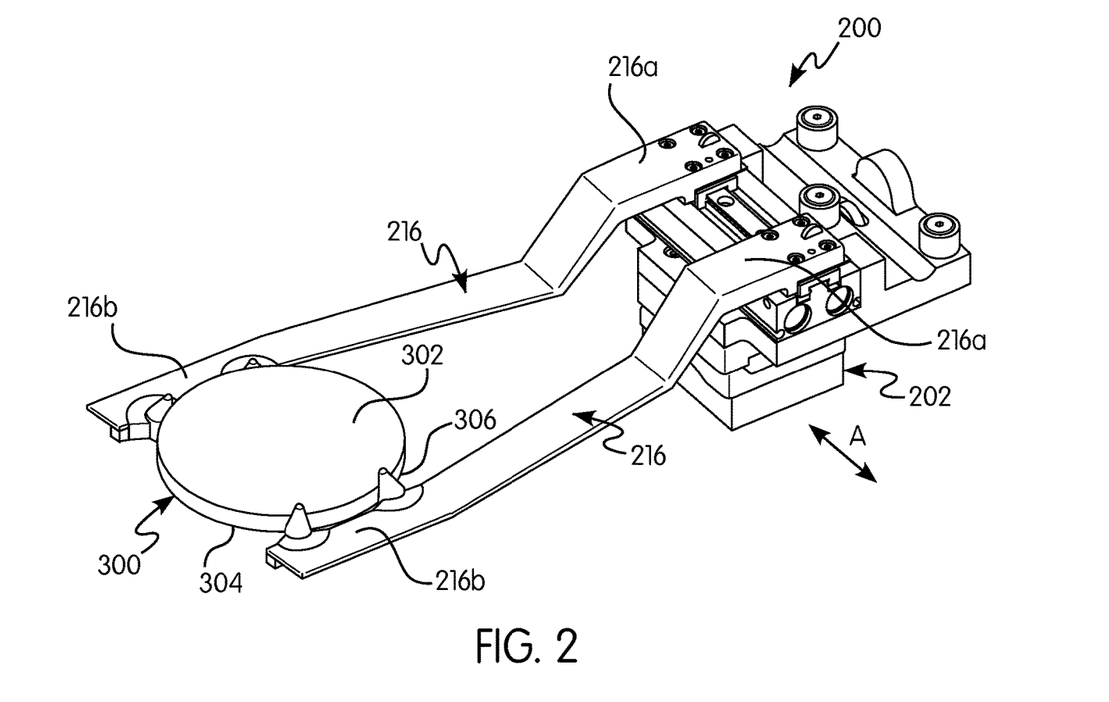
FIG. 2 is a representative perspective view of an optical article transport vehicle for use with an optical article production line according to some examples of the present invention.

With reference to FIG. 2, the transport vehicle 200 has a carrier base 202 configured for movement along the guideway 102. In some examples, at least a portion of the carrier base 202 has a magnetic flux source for magnetically interacting with the guideway 102. In examples where the transport vehicle 200 is adapted for movement along the guideway 102 that is configured as a conveyor belt, the carrier base 202 may have an appropriate structure for mechanically interacting with the conveyor belt. For example, the carrier base 202 may have one or more wheels, bearings, or other mechanical structures for interacting with the conveyor belt.

With continued reference to FIG. 2, the transport vehicle 200 has a pair of gripping arms 216 configured for holding the optical article 300 during transport. Each gripping arm 216 has a first end 216a connected to the transport vehicle 200 and a second end 216b protruding from the transport vehicle 200. In some examples, each gripping arm 216 is connected at its first end 216a to the carrier base 202. The gripping arms 216 are movable between a closed position and an open position. In the closed position, the gripping arms 216 are configured for holding the optical article 300 therebetween or thereon, while, in the open position, the optical article 300 is released from the gripping arms 216. For example, in the closed position, the gripping arms 216 may support a bottom surface of the optical article 300 or a side surface of the optical article 300. The gripping arms 216 protrude relative to the carrier base 202 in a direction substantially perpendicular to a direction of travel of the carrier base 202 identified by arrow A in FIG. 2. In some examples, the transport vehicle 200 may be made in accordance with any example described in International Application No. PCT/EP18/57906.

With continued reference to FIG. 2, the optical article 300 has a forward or top surface 302, a rearward or bottom surface 304, and a side surface 306 extending between the top surface 302 and the bottom surface 304. When the optical article 300 is an ophthalmic lens, the bottom surface 304 is opposed to the eye of an individual wearing the optical article 300, the side surface 306 typically resides within a supportive frame, and the top surface 302 faces incident light (not shown), at least a portion of which passes through the optical article 300 and into the individual's eye. With some examples, at least one of the top surface 302, the bottom surface 304, and the side surface 306 may have various shapes including, but not limited to, round, flat, cylindrical, spherical, planar, substantially planar, plano-concave and/or plano-convex, and curved, including, but not limited to, convex, and/or concave. During transport on the transport vehicle 200, the optical article 300 is supported by the gripping arms 216, such as by the bottom surface 304 or the side surface 306.

The optical article 300 can be selected from ophthalmic articles or elements, display articles or elements, visors, windows, mirrors, active liquid crystal cell articles or elements, and passive liquid crystal cell articles or elements. Examples of ophthalmic articles or elements include, but are not limited to, corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors. Examples of display articles, elements and devices include, but are not limited to, screens, monitors, and security elements, including without limitation, security marks and authentication marks. Examples of windows include, but are not limited to, automotive and aircraft transparencies, filters, shutters, and optical switches. The optical article 300 can comprise a polymeric organic material chosen from thermosetting polymeric organic materials, thermoplastic polymeric organic materials, or a mixture of such polymeric organic materials.

Referring back to FIG. 1, the production line 100 has a plurality of processing stations 104 positioned along the guideway 102. Each processing station 104 is configured for performing a predetermined processing step on the optical article 300 carried by the transport vehicle 200. Each transport vehicle 200 may be configured to be independently moved along the guideway 102 between various processing stations 104. At least one of the processing stations 104 may be a pre-treatment station 104a, such as a plasma chamber, a washing/drying station 104b, and at least one coating station 104c configured to apply a coating material on at least one surface of the optical article. In some examples, at least one of the processing stations may be a curing station 104d for selectively and independently curing (such as at least partially curing) each coating applied to the optical article by the coating station 104c. The curing station 104d has a curing apparatus 400, such as a UV curing apparatus, as described herein.

With some examples, the curing station 104d may be a pass-through processing station wherein at least a portion of the transport vehicle 200, along with the optical article 300 carried thereon, moves through the curing apparatus 400. For example, a first portion of the transport vehicle 200, such as the carrier base 202, may move on the guideway 102 positioned outside of the curing apparatus 400, while a second portion, such as at least a portion of the gripping arms 216 carrying the optical article 300, moves through the curing apparatus 400. In such examples, the curing apparatus 400 is positioned adjacent to the guideway 102. For example, the curing apparatus 400 may be arranged substantially parallel to the guideway 102. In other examples, the curing apparatus 400 is configured such that the guideway 102 passes therethrough. In such examples, the entire transport vehicle 200, along with the optical article 300 carried thereon, passes through the curing apparatus 400.

Figure 3:
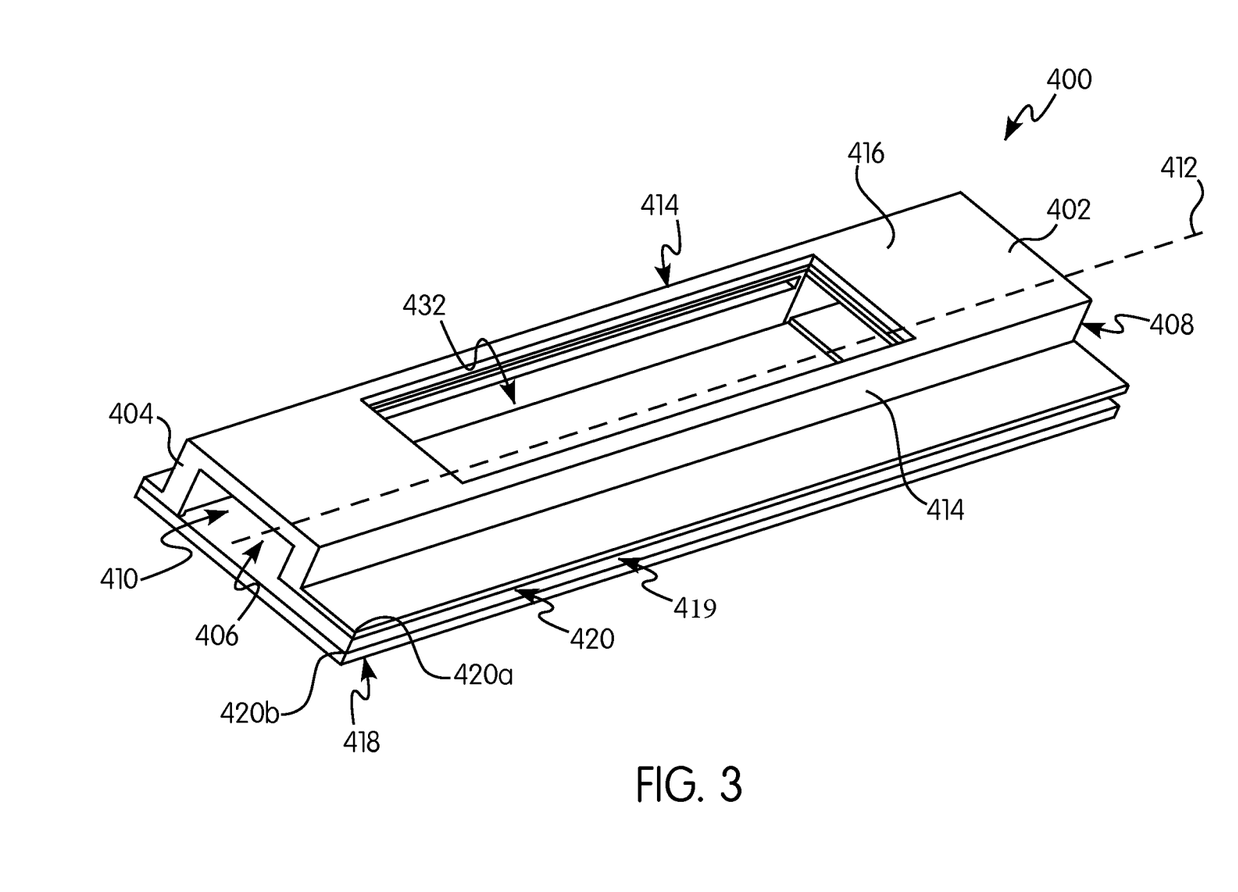
FIG. 3 is a representative perspective view of a curing apparatus in accordance with some examples of the present invention.

With reference to FIG. 3, the curing apparatus 400 is shown in accordance with one example. The curing apparatus 400 has a housing 402 having a sidewall 404 defining an interior chamber 406. The housing 402 has an inlet 408 spaced apart from an outlet 410 along an axis, such as a longitudinal axis 412 of the housing 402. The inlet 408 and the outlet 410 are open and are configured to permit passage of the optical article 300 and at least a portion of the transport vehicle 200, such as at least a portion of the gripping arms 216, through the interior chamber 406 in a direction from the inlet 408 toward the outlet 410. The housing 402 has a pair of longitudinal portions 414 extending between the inlet 408 and the outlet 410. The longitudinal portions 414 may be arranged substantially parallel to one another. In some examples, the longitudinal portions 414 may be substantially parallel to the longitudinal axis 412. In some examples, the curing apparatus 400 may have a plurality of housings 402 combined together end-to-end to define a larger interior chamber 406.

With continued reference to FIG. 3, the housing 402 has an upper portion 416 spaced apart from a lower portion 418. The interior chamber 406 is defined between the upper portion 416 and the lower portion 418, and between the pair of longitudinal portions 414. In some examples, the pair of longitudinal portions 414, the upper portion 416, and/or the lower portion 418 may be removably or non-removably connected to each other, such as using one or more fasteners. In other examples, the pair of longitudinal portions 414, the upper portion 416, and/or the lower portion 418 may be monolithically formed with each other.

With continued reference to FIG. 3, the housing 402 has at least one opening extending through the sidewall 404. The at least one opening 419 may be any aperture, gap, or slot that extends through the sidewall 404. The at least one opening 419 may extend from the inlet 408 to the outlet 410 of the housing 402 such that the interior chamber 406 is open at the inlet 408, the outlet 410, and along the entire length of the at least one opening 419. In some examples, the at least one opening 419 extends continuously from the inlet 408 to the outlet 410 of the housing 402. In some examples, the at least one opening 419 may extend through the sidewall 404 of each of the pair of longitudinal portions 414 and/or one or both of the upper portion 416 and the lower portion 418. In some examples, the at least one opening 419 is substantially parallel with the longitudinal axis 412 and/or a longitudinal axis of the guideway 102.

With continued reference to FIG. 3, the at least one opening 419 may be configured as an open slot 420 (hereinafter referred to as "slot 420"). The slot 420 may be defined as a long and narrow aperture or slit extending through the sidewall 404 of the housing 402. The slot 420 has an upper end 420a opposite a lower end 420b with a receiving space defined therebetween. The slot 420 desirably has a smaller height, as measured in a direction between the upper end 420a and the lower end 420b, than a height of the interior chamber 406, as measured in a direction between the upper portion 416 and the lower portion 418.

While FIG. 3 shows the at least one opening 419 shaped as the slot 420, other shapes and configurations of the at least one opening 419 are not precluded. For example, the at least one opening 419 may be configured as an aperture or gap in the sidewall 404. In various examples, the at least one opening 419 is configured to receive at least a portion of an object that is external to the housing 402 to allow passage of a portion of the object through the interior chamber 406 as the object moves past the housing 402 in a direction from the inlet 408 toward the outlet 410. In this manner, a first portion of the object can move outside the housing 402 and a second portion of the object can move through the interior chamber 406 via the at least one opening 419. In some examples, the object may be the transport vehicle 200 configured for supporting the optical article 300, as described herein.

Figure 4A:
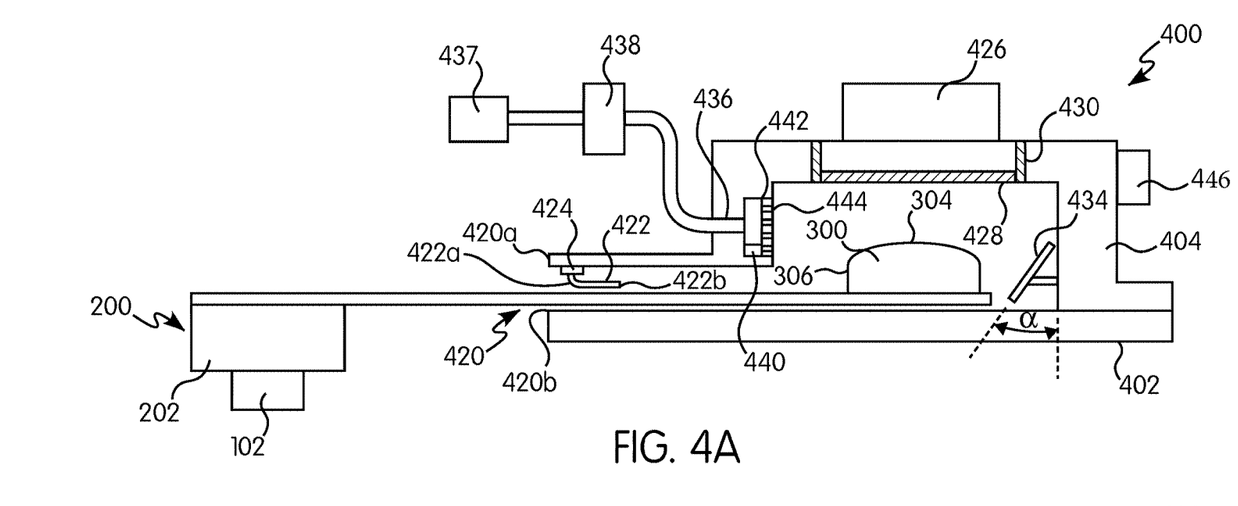
FIG. 4A is a representative side cross-sectional view of a curing apparatus shown in FIG. 3 with a deflectable barrier shown in a first position.

With reference to FIG. 4A, the slot 420 is configured to receive a portion of the transport vehicle 200 moving along the guideway 102 outside of the housing 402 such that the optical article 300 supported by the transport vehicle 200 moves through the interior chamber 406 on the portion of the transport vehicle 200 extending through the slot 420. As discussed herein, the curing apparatus 400 is positioned adjacent to the guideway 102 such that the guideway 102 is completely outside of the interior chamber 406 of the housing 402. The curing apparatus 400 is spaced apart from the guideway 102 such that at least a portion of the transport vehicle 200 passes through the interior chamber 406 via the slot 420 as the transport vehicle 200 moves along the guideway 102 past the curing apparatus 400. For example, the curing apparatus 400 is spaced apart from the guideway 102 such that at least a portion of the gripping arms 216 of the transport vehicle 200 extends through the slot 420 and into the interior chamber 406. The second end 216b of the gripping arms 216 supporting the optical article 300 is desirably positioned within the interior chamber 406 during movement of the gripping arms 216 through the housing 402.

Figure 4B:
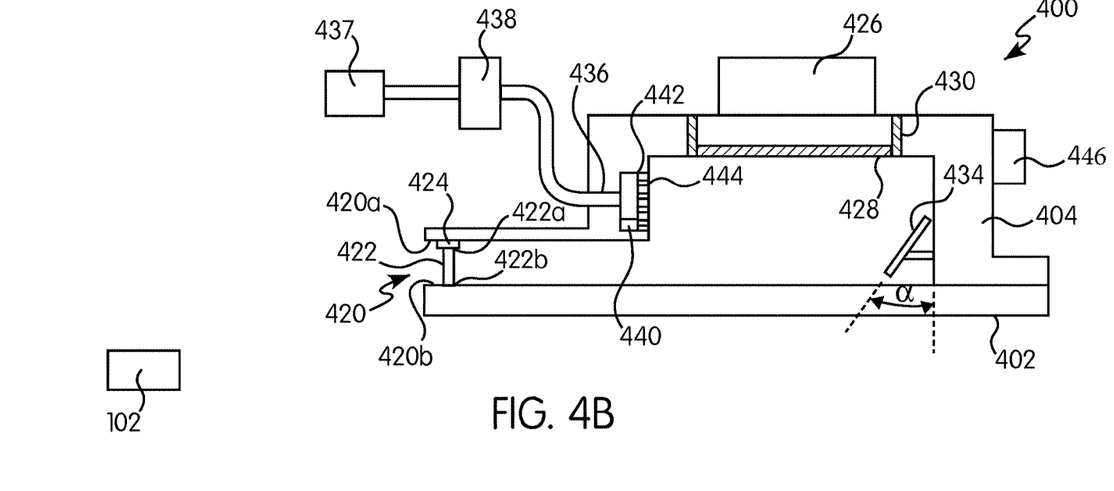
FIG. 4B is a representative side view of a curing apparatus shown in FIG. 3 with the deflectable barrier shown in a second position.

With reference to FIGS. 4A-4B, the curing apparatus 400 has a deflectable barrier 422 extending across the slot 420 to enclose the slot 420. In this manner, the deflectable barrier 422 encloses the interior chamber 406 in a longitudinal direction between the inlet 408 and the outlet 410 to prevent ambient air surrounding the housing 402 from entering into the interior cavity 406. The deflectable barrier 422 may extend along at least a portion of a longitudinal length of the slot 420 in a direction from the inlet 408 to the outlet 410. In some examples, the deflectable barrier 422 extends along the entire longitudinal length of the slot 420. The deflectable barrier 422 further extends from the upper end 420a of the slot 420 to the lower end 420b of the slot 420.

With continued reference to FIGS. 4A-4B, the deflectable barrier 422 has a first end 422a connected to one of the upper end 420a and the lower end 420b of the slot 420 and a second end 422b deflectable relative to the first end 422a. As shown in FIGS. 4A-4B, the first end 422a of the deflectable barrier 422 may be connected to a frame 424 mounted to the upper end 420a of the slot 420, while the second end 422b is free and deflectable relative to the first end 422a in a direction toward or away from the interior cavity 406. The frame 424 may be removably connected to the upper end 420a of the slot 420 to allow for removal of the deflectable barrier 422, such as during servicing of the curing apparatus 400. In some examples, the frame 424 may be magnetically attached to the upper end 420a of the slot 420. In other examples, the frame 424 is connected to the upper end 420a of the slot 420 by one or more fasteners.

With continued reference to FIGS. 4A-4B, the second end 422b may be deflectable by the gripping arms 216 as the gripping arms 216 pass through the slot 420. The deflectable barrier 422 is deflectable from a closed position (FIG. 4B) that completely closes the slot 420 to an open position (FIG. 4A) that at least partially opens the slot 420 to allow for the passage of at least a portion of the transport vehicle 200, such as the gripping arms 216. The deflectable barrier 422 may be configured such that it deflects only in an area surrounding the gripping arms 216 as the gripping arms 216 pass through the slot 420. For example, the deflectable barrier 422 may be made from a flexible material that is configured to deflect due to contact with the gripping arms 216 of the transport vehicle 200. In some examples, the deflectable barrier 422 may be a cloth curtain. The cloth curtain may be made from a material that is resistant to ultraviolet radiation and prevents or limits gas exchange between the interior chamber 406 and the surrounding atmosphere. Desirably, the cloth curtain is made from a lint-free cloth material.

With continued reference to FIGS. 4A-4B, the curing apparatus 400 has at least one ultraviolet radiation source 426 (hereinafter referred to "UV source 426") operative for transmitting ultraviolet (UV) radiation into the interior chamber 406. The curing apparatus 400 may have a plurality of UV sources 426 spaced apart longitudinally between the inlet 408 and the outlet 410 of the housing 402. The at least one UV source 426 may be mounted to the upper portion 416 of the housing 402 such that it directs UV radiation into the interior chamber 406 from the upper end of the housing 402. In some examples, the at least one UV source 426 may be mounted to the lower portion 418 of the housing 402 such that it directs UV radiation into the interior chamber 406 from the lower end of the housing 402. In further examples, at least a pair of UV sources 426 may be mounted to the upper portion 416 and the lower portion 418 of the housing 402 such that the UV sources 426 direct UV radiation into the interior chamber 406 from the upper and lower ends of the housing 402. In some examples, the at least one ultraviolet radiation source 426 may be an ultraviolet lamp having at least one bulb, such as a mercury bulb, configured for emitting radiation within the ultraviolet spectrum. The specifications of the at least one ultraviolet radiation source 426 may be selected depending on a type of coating to be cured.

Figure 5:
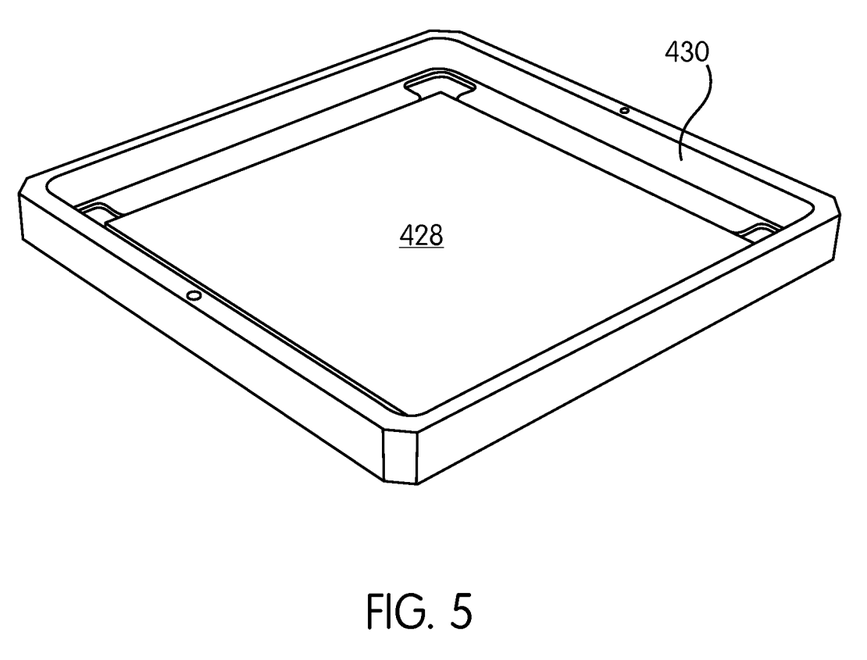
FIG. 5 is a representative perspective view of a frame and a filter for use with the curing apparatus of FIG. 3.

With continued reference to FIGS. 4A-4B, a filter 428 may be positioned between the at least one UV source 426 and the interior chamber 406. The filter 428 may be configured for filtering the UV radiation from the at least one UV source 426, such as filtering radiation of a desired wavelength. With reference to FIG. 5, the filter 428 may be a quartz filter. The specifications of the filter 428 may be selected depending on a desired wavelength of ultraviolet radiation to be filtered. The filter 428 may be secured within a frame 430 mounted within an opening 432 extending through the sidewall 404 of the housing 402. In some examples, the opening 432 may be provided in the upper portion 416 of the housing 402, such as shown in FIG. 3. The filter 428 may be removably secured within the frame 430. In this manner, the filter 428 can be removed for cleaning and/or replaced with another filter 428 having different filtering characteristics.

Referring again to FIGS. 4A-4B, in embodiments where the UV source 426 is positioned over the optical article 300 as the optical article 300 passes through the interior chamber 406, the top surface 302 of the optical article 300 is exposed to most of the UV radiation from the UV source 426, whereas the side surface 306 may be exposed to only a portion of the UV radiation received by the top surface 302. In this manner, if a coating is applied to the top surface 302 and the side surface 306 of the optical article 300 (or only the side surface 306), the coating on the side surface 306 may not be adequately cured.

The curing apparatus 400 may have at least one reflective element 434 positioned within the interior chamber 406 to reflect at least a portion of UV radiation emitted from the at least one UV source 426 in a direction toward the optical article 300, such as the side surface 306 of the optical article 300, as the optical article 300 passes through the interior chamber 406. The at least one reflective element 434 is desirably spaced apart from the optical article 300 and the gripping arms 216 of the transport vehicle 200 in order not to inhibit the movement of the optical article 300 and the gripping arms 216 through the interior chamber 406. The curing apparatus 400 may have a plurality of reflective elements 434 spaced apart longitudinally between the inlet 408 and the outlet 410 of the housing 402. The at least one reflective element 434 may be angled at an angle α relative to the sidewall 404 of the housing 402. The angle α may be between 20° and 70°. The surface of the at least one reflective element 434 may be planar, concave, or convex. In some examples, the at least one reflective element 434 may be a reflective mirror, or a mirror-like film.

With continued reference to FIGS. 4A-4B, the interior chamber 406 of the curing apparatus 400 may have an atmosphere that is different from the atmosphere outside the interior chamber 406. In some examples, the interior chamber 406 may have an inert atmosphere due to increased concentration of an inert gas, such as nitrogen or one or more noble gases. Without intending to be bound by theory, it has been found that curing of the coating covering the optical article 300 can be significantly improved when the coating is exposed to UV radiation.

With continued reference to FIGS. 4A-4B, at least one nozzle 436 may be provided for delivering the inert gas into the interior chamber 406. The at least one nozzle 436 is in communication with a vessel 437 containing the inert gas. In some examples, a plurality of nozzles 436 may be spaced apart longitudinally between the inlet 408 and the outlet 410 of the housing 402. The spacing of the plurality of nozzles 436 may be such that the concentration of the inert gas within the interior chamber 406 is evenly distributed between the inlet 408 and the outlet 410. In some examples, the at least one nozzle 436 may be configured for delivering the inert gas into the interior chamber 406 at a fixed flow rate. In other examples, the at least one nozzle 436 may be adjustable to control the flow rate at which the inert gas is delivered to the interior chamber 406. In such examples, an adjustment device 438, such as a valve, may be provided for controlling the flow rate of the at least one nozzle 436. The adjustment device 438 may be manually adjustable, or electronically adjustable via a controller. At least one sensor 440 may be provided for detecting a concentration of the inert gas in the interior chamber 406 and adjusting a flow rate of the inert gas through the at least one nozzle 436 to maintain the concentration of the inert gas at a predetermined level. For example, the inert atmosphere inside the interior chamber 406 may be maintained such that oxygen concentration is less than 150 ppm.

With continued reference to FIGS. 4A-4B, the curing apparatus 400 may have at least one diffuser plate 442 disposed between the at least one nozzle 436 and the interior chamber 406. The at least one diffuser plate 442 may have a plurality of openings 444 configured for flowing the inert gas therethrough and into the interior chamber 406. The openings 444 may have a small diameter, such as around 5 µm, in order to evenly diffuse the inert gas within the interior chamber 406. The curing apparatus 400 may also have a heat exchanger 446 configured for heating or cooling at least one of the housing 402, the inert gas within the interior chamber 406 of the housing 402, or the inert gas flowing from the at least one nozzle 436.

The inlet 408 and the outlet 410 may be selectively closable to enclose the interior chamber 406. Desirably, the inlet 408 and the outlet 410 may have a gate mechanism that may be opened to allow the passage of the optical article 300 and at least a portion of the transport vehicle 200, such as at least a portion of the gripping arms 216, into and out of the interior chamber 406, and closed at all other times to maintain the inert atmosphere within the interior chamber 406. In this manner, when combined with the deflectable barrier 422, the gate mechanism of the inlet 408 and the outlet 410 provides for a substantially sealed interior chamber 406 while allowing for pass-through treatment of the optical article 300.

Figure 6:
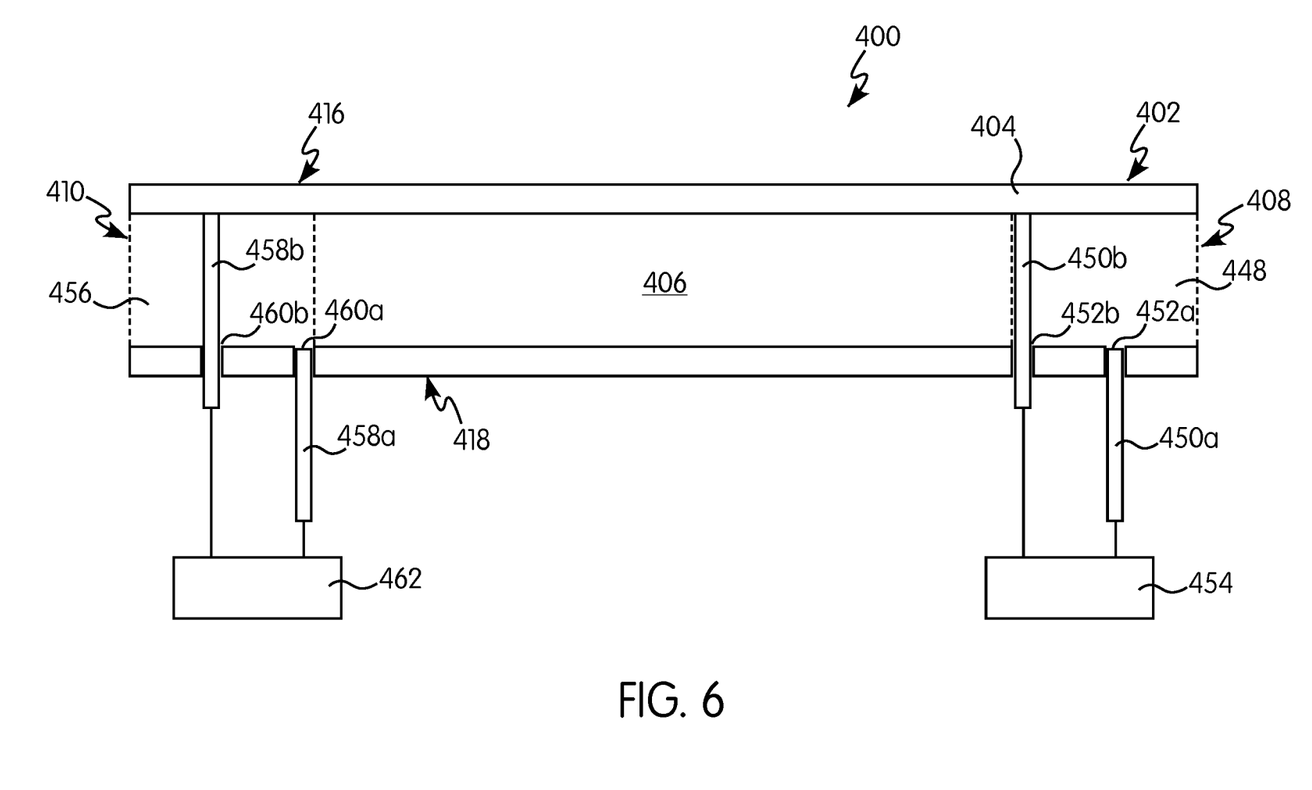
FIG. 6 is a representative front cross-sectional view of the curing apparatus shown in FIG. 3.

With reference to FIG. 6, the inlet 408 may have an inlet sub-chamber 448 defined between a first inlet gate 450a and a second inlet gate 450b. In some examples, the inlet sub-chamber 448 may have at least one nozzle 436 for delivering inert gas. The first inlet gate 450a and the second inlet gate 450b are spaced apart from each other in a direction along the longitudinal axis 412. The first inlet gate 450a is extendable into the inlet sub-chamber 448 through a first inlet gate opening 452a in the housing 402. Similarly, the second inlet gate 450a is extendable into the inlet sub-chamber 448 through a second inlet gate opening 452b in the housing 402. The first and second inlet gates 450a, 450b are independently operable between a closed position, wherein the first and second inlet gates 450a, 450b extend into the inlet sub-chamber 448 through the first and second inlet gate openings 452a, 452b, respectively, to enclose the inlet 408, and an open position, wherein the first and second inlet gates 450a, 450b are withdrawn into the first and second inlet gate openings 452a, 452b, respectively, to open the inlet 408. A first drive mechanism 454, such as an electric motor, is provided for moving the first and second inlet gates 450a, 450b between the open and closed positions. In the closed position, the first and second inlet gates 450a, 450b prevent movement of the optical article 300 and the portion of the transport vehicle 200 supporting the optical article 300 into the inlet 408. At least one of the first and second inlet gates 450a, 450b is maintained in the closed position throughout the movement of the optical article 300 through the interior chamber 406 between the inlet 408 and the outlet 410 to maintain the inert atmosphere within the interior chamber 406.

Figure 7A:
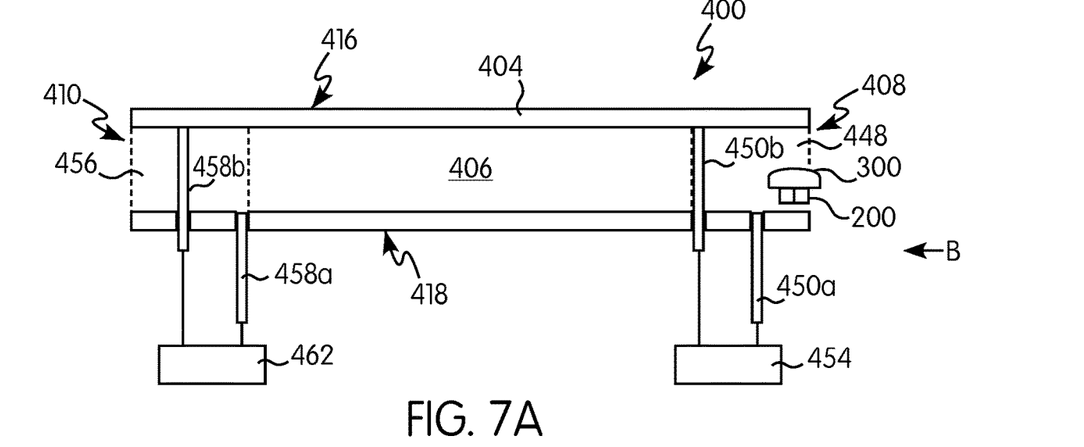
FIGS. 7A-7C are representative front cross-sectional side views of an inlet sub-chamber during passage of an optical article carried by an optical article transport vehicle through the inlet sub-chamber.
Figure 7B:
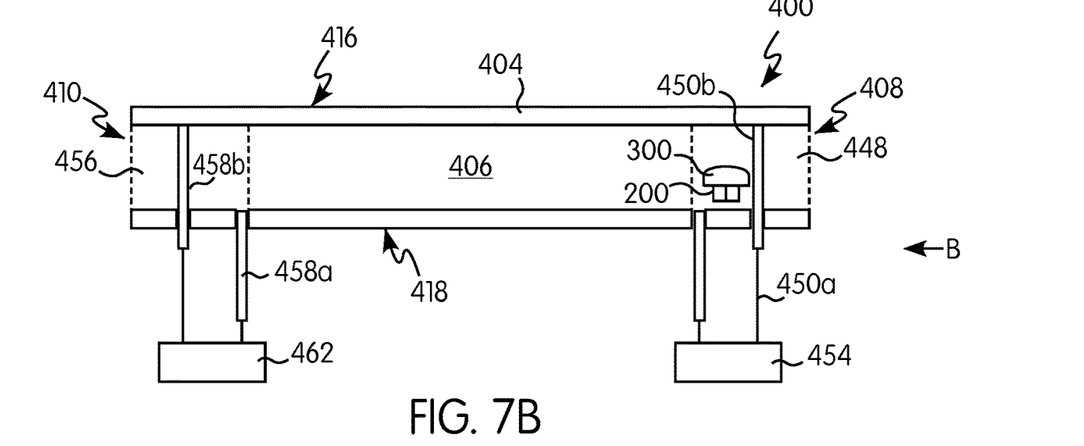
Figure 7C:
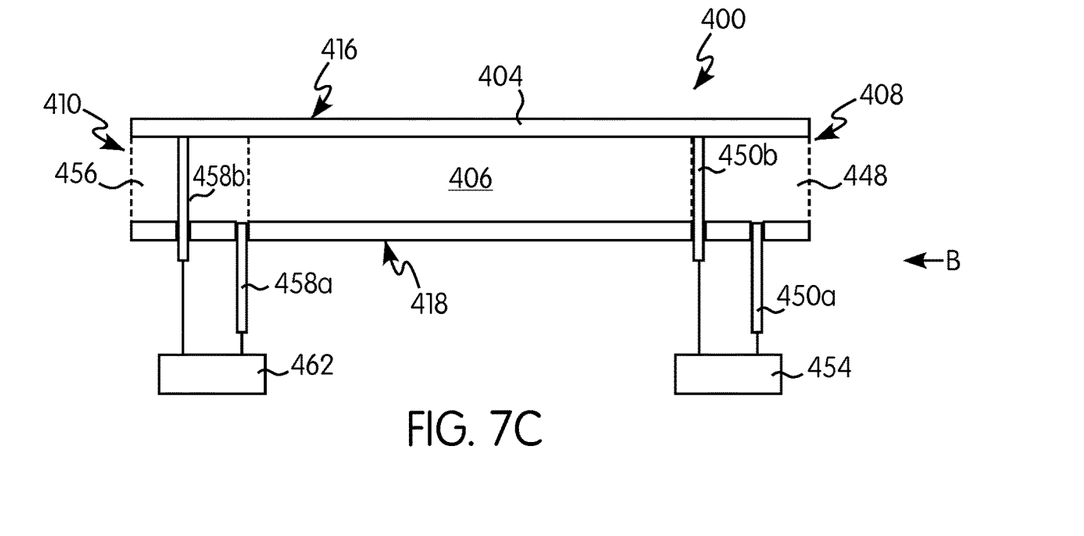

With reference to FIGS. 7A-7C, the first inlet gate 450a and the second inlet gate 450b are sequentially operated from the closed position to the open position during movement of the optical article 300 through the inlet 408 in a direction of arrow B. The guideway 102 is omitted for clarity. As shown in FIG. 7A, the first inlet gate 450a is in the open position, while the second inlet gate 450b is closed. In this manner, the optical article 300 carried by the transport vehicle 200 can enter the inlet 408 of the housing 402. Once the transport vehicle 200 moves past the first inlet gate opening 452a such that the optical article 300 is positioned within the inlet sub-chamber 448, the first inlet gate 450a is moved to the closed position, while the second inlet gate 450b is moved to the open position (FIG. 7B). One or more sensors (not shown) may be used for detecting a position of the transport vehicle 200 relative to the first and second inlet gates 450a, 450b and providing a signal to a controller operating the first and second inlet gates 450a, 450b between the closed and open positions. As the transport vehicle 200 moves past the second inlet gate opening 452b such that the optical article 300 is positioned within the interior chamber 406, the second inlet gate 450b is moved to the closed position, while the first inlet gate 450a is moved to the open position (FIG. 7C). In this manner, the optical article 300 can be received within the inlet sub-chamber 448 and into the interior chamber 406 while maintaining the inert atmosphere within the interior chamber 406.

With reference to FIG. 6, the outlet 410 may have an outlet sub-chamber 456 defined between a first outlet gate 458a and a second outlet gate 458b. In some examples, the outlet sub-chamber 456 may have at least one nozzle 436 for delivering inert gas. The first outlet gate 458a and the second outlet gate 458b are spaced apart from each other in a direction along the longitudinal axis 412. The first outlet gate 458a is extendable into the outlet sub-chamber 456 through a first outlet gate opening 460a in the housing 402. Similarly, the second outlet gate 458a is extendable into the outlet sub-chamber 456 through a second outlet gate opening 460b in the housing 402. The first and second outlet gates 458a, 458b are independently operable between a closed position, wherein the first and second outlet gates 458a, 458b extend into the outlet sub-chamber 456 through the first and second outlet gate openings 460a, 460b, respectively, to enclose the outlet 410, and an open position, wherein the first and second outlet gates 458a, 458b are withdrawn into the first and second outlet gate openings 460a, 460b, respectively, to open the outlet 410. A second drive mechanism 462, such as an electric motor, is provided for moving the first and second outlet gates 458a, 458b between the open and closed positions. In the closed position, the first and second outlet gates 458a, 458b prevent movement of the optical article 300 and the portion of the transport vehicle 200 supporting the optical article 300 into the outlet 410. At least one of the first and second outlet gates 458a, 458b is maintained in the closed position throughout the movement of the optical article 300 through the interior chamber 406 between the inlet 408 and the outlet 410 to maintain the inert atmosphere within the interior chamber 406.

Figure 8A:
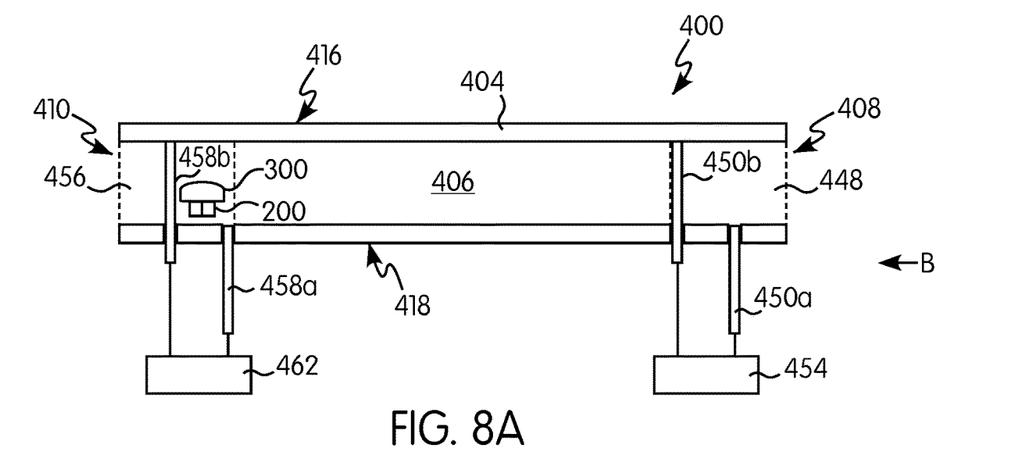
FIGS. 8A-8C are representative front cross-sectional front views of an outlet sub-chamber during passage of an optical article carried by an optical article transport vehicle through the outlet sub-chamber.
Figure 8B:
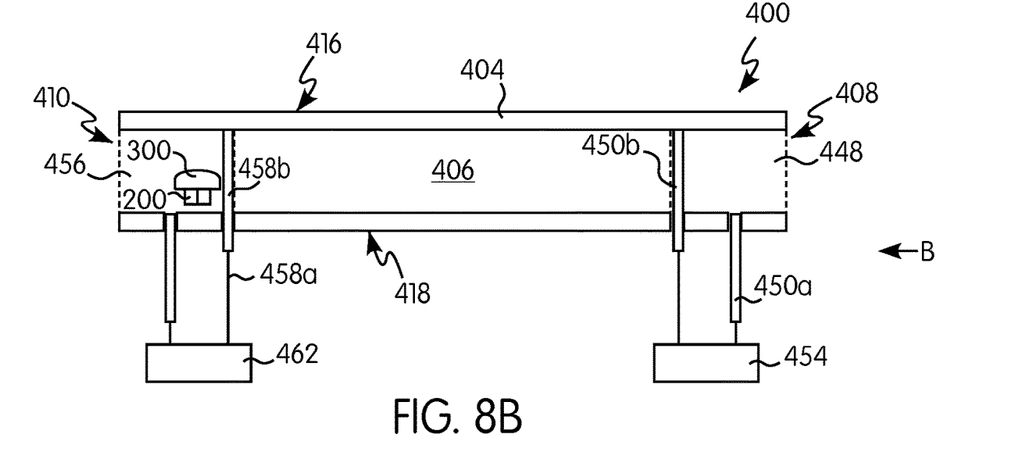
Figure 8C:
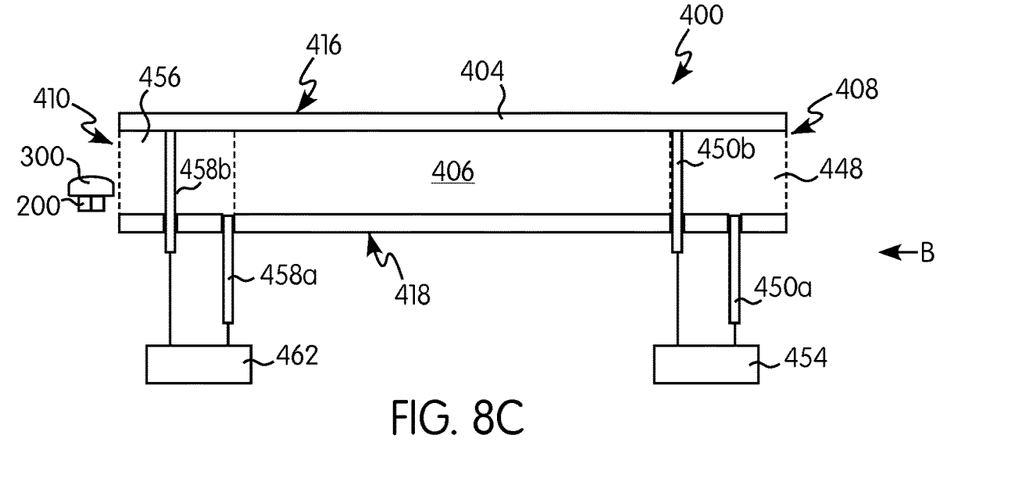

With reference to FIGS. 8A-8C, the first outlet gate 458a and the second outlet gate 458b are sequentially operated from the closed position to the open position during movement of the optical article 300 through the outlet 410 in a direction of arrow B. The guideway 102 is omitted for clarity. As shown in FIG. 8A, the first outlet gate 458a is in the open position, while the second outlet gate 458b is closed. In this manner, the optical article 300 carried by the transport vehicle 200 can enter the outlet sub-chamber 456. Once the transport vehicle 200 moves past the first outlet gate opening 460a such that the optical article 300 is positioned within the outlet sub-chamber 456, the first outlet gate 458a is moved to the closed position, while the second outlet gate 458b is moved to the open position (FIG. 8B). One or more sensors (not shown) may be used for detecting a position of the transport vehicle 200 relative to the first and second outlet gates 458a, 458b and providing a signal to a controller operating the first and second outlet gates 458a, 458b between the closed and open positions. As the transport vehicle 200 moves past the second outlet gate opening 460b such that the optical article 300 is moved outside of the housing 402, the second outlet gate 458b is moved to the closed position, while the first outlet gate 458a is moved to the open position (FIG. 8C). In this manner, the optical article 300 can be moved from the interior chamber 406 through the outlet 410 while maintaining the inert atmosphere within the interior chamber 406.

In further examples, the curing apparatus 400 can be characterized by one or more of the following clauses:

Clause 1: A curing apparatus comprising: a housing having a sidewall with an inlet spaced apart from an outlet along an axis, the housing defining an interior chamber; at least one opening extending through the sidewall, for example, from the inlet to the outlet; at least one ultraviolet radiation source operative for transmitting ultraviolet radiation into the interior chamber; and at least one nozzle in flow communication with the interior chamber.

Clause 2: The curing apparatus of clause 1, wherein the axis is a longitudinal axis.

Clause 3: The curing apparatus of clauses 1 or 2, wherein the at least one flow nozzle is connected to a source of inert gas and is configured to inject inert gas into the interior chamber.

Clause 4: The curing apparatus of any of clauses 1 to 3, wherein the at least one opening is a slot extending from the inlet to the outlet and configured to receive a portion of an article carrier moving along a guideway outside of the housing such that an article supported by the article carrier moves through the interior chamber on the portion of the article carrier extending through the slot.

Clause 5: The curing apparatus of clause 4, further comprising a deflectable barrier extending across the slot between the inlet and the outlet, wherein the deflectable barrier is deflectable by the portion of the article carrier extending through the slot.

Clause 6: The curing apparatus of clause 5, wherein the deflectable barrier is a cloth curtain.

Clause 7: The curing apparatus of any of clauses 1 to 6, wherein the inlet comprises an inlet sub-chamber defined between a first inlet gate and a second inlet gate spaced apart from the first inlet gate in a direction along the axis, the first inlet gate and the second inlet gate enclosing the inlet of the housing.

Clause 8: The curing apparatus of clause 7, wherein the first inlet gate and the second inlet gate are sequentially operated from a closed position to an open position during movement of the article through the inlet.

Clause 9: The curing apparatus of clauses 7 or 8, wherein the second inlet gate is movable to the open position when the first inlet gate is in the closed position.

Clause 10: The curing apparatus of any of clauses 1 to 9, wherein the outlet comprises an outlet sub-chamber defined between a first outlet gate and a second outlet gate spaced apart from the first outlet gate in a direction along the axis, the first outlet gate and the second outlet gate enclosing the outlet of the housing.

Clause 11: The curing apparatus of clause 10, wherein the first outlet gate and the second outlet gate are sequentially operated from a closed position to an open position during movement of the article through the outlet.

Clause 12: The curing apparatus of clauses 10 or 11, wherein the second outlet gate is movable to the open position when the first outlet gate is in the closed position.

Clause 13: The curing apparatus of any of clauses 1 to 12, further comprising a filter positioned between the at least one ultraviolet radiation source and the interior chamber.

Clause 14: The curing apparatus of clause 13, wherein the filter is mounted within a frame positioned in an opening extending through the sidewall of the housing.

Clause 15: The curing apparatus of clause 14, wherein the interior chamber is air-tight at an interface between the frame and the sidewall of the housing.

Clause 16: The curing apparatus of any of clauses 1 to 15, wherein the at least one nozzle has an adjustment mechanism for adjusting a flow rate of inert gas into the interior chamber.

Clause 17: The curing apparatus of any of clauses 1 to 16, further comprising at least one diffuser plate disposed between the at least one nozzle and the interior chamber, the at least one diffuser plate having a plurality of gas-permeable openings configured for diffusing inert gas into the interior chamber.

Clause 18: The curing apparatus of any of clauses 1 to 17, further comprising a heat exchanger configured for heating or cooling at least one of the housing, the inert gas within the interior chamber of the housing, or the inert gas flowing from the at least one nozzle.

Clause 19: The curing apparatus of any of clauses 1 to 18, further comprising at least one reflective element within the interior chamber, the at least one reflective element having an angled reflective surface configured for reflecting at least a portion of the ultraviolet radiation from the at least one ultraviolet radiation source toward a lateral side of the article.

Clause 20: A method of curing a coated article using a curing apparatus, the method comprising: transporting the article on an article carrier movable along a guideway adjacent to the curing apparatus; moving the article through an interior chamber of the curing apparatus in a direction from an inlet toward an outlet of the curing apparatus; and exposing at least a portion of the article to ultraviolet radiation during movement of the article through the interior chamber, wherein, during movement of the article through the interior chamber, a portion of the article carrier supporting the article moves through at least one opening extending through a housing of the curing apparatus between the inlet and the outlet.

Clause 21: The method of clause 20, further comprising enclosing the at least one opening with a deflectable barrier, wherein the deflectable barrier is deflectable by the portion of the article carrier during movement of the article through the interior chamber.

Clause 22: The method of clauses 20 or 21, further comprising injecting inert gas into the interior chamber from at least one nozzle.

Clause 23: The method of clause 21, further comprising diffusing the inert gas through a diffuser plate during injecting of the inert gas into the interior chamber.

Clause 24: The method of any of clauses 20-23, further comprising moving the article through an inlet sub-chamber prior to moving the article through the inlet, the inlet sub-chamber defined between a first inlet gate and a second inlet gate spaced apart from the first inlet gate and enclosing the inlet, wherein the first inlet gate and the second inlet gate are sequentially operated from a closed position to an open position during movement of the article through the inlet sub-chamber to prevent introduction of ambient air into the interior chamber through the inlet.

Clause 25: The method of any of clauses 20-24, further comprising moving the article through an outlet sub-chamber prior to moving the article through the outlet, the outlet sub-chamber defined between a first outlet gate and a second outlet gate spaced apart from the first outlet gate and enclosing the outlet, wherein the first outlet gate and the second outlet gate are sequentially operated from a closed position to an open position during movement of the article through the outlet sub-chamber to prevent introduction of ambient air into the interior chamber through the outlet.

Clause 26: The method of any of clauses 20-25, further comprising filtering the ultraviolet radiation prior to exposing at least a portion of the article to the ultraviolet radiation.

Clause 27: The method of any of clauses 20-26, further comprising reflecting at least a portion of the ultraviolet radiation toward a lateral side of the article using at least one reflective element.

The present invention has been described with reference to specific details of particular examples thereof. It is not intended that such details be regarded as limitations upon the scope of the invention except insofar as and to the extent that they are included in the accompanying claims.

What is claimed is:

1. A curing apparatus comprising:
   a housing having a sidewall with an inlet spaced apart from an outlet along an axis, the housing defining an interior chamber;
   an open slot extending through the sidewall continuously from the inlet to the outlet of the housing;
   at least one ultraviolet radiation source operative for transmitting ultraviolet radiation into the interior chamber; and
   at least one nozzle in flow communication with the interior chamber.

2. The curing apparatus of claim 1, wherein the at least one nozzle is connected to a source of an inert gas and is configured to inject the inert gas into the interior chamber.

3. The curing apparatus of claim 1, wherein the open slot is configured to receive a portion of an article carrier moving along a guideway outside of the housing such that an article supported by the article carrier moves through the interior chamber on the portion of the article carrier extending through the slot.

4. The curing apparatus of claim 3, further comprising a deflectable barrier extending across the slot between the inlet and the outlet, wherein the deflectable barrier is deflectable by the portion of the article carrier extending through the slot.

5. The curing apparatus of claim 1, wherein the inlet comprises an inlet sub-chamber defined between a first inlet gate and a second inlet gate spaced apart from the first inlet gate in a direction along the axis, the first inlet gate and the second inlet gate enclosing the inlet of the housing.

6. The curing apparatus of claim 5, wherein the first inlet gate and the second inlet gate are sequentially operated from a closed position to an open position during movement of an article through the inlet.

7. The curing apparatus of claim 6, wherein the second inlet gate is movable to the open position when the first inlet gate is in the closed position.

8. The curing apparatus of claim 1, wherein the outlet comprises an outlet sub-chamber defined between a first outlet gate and a second outlet gate spaced apart from the first outlet gate in a direction along the axis, the first outlet gate and the second outlet gate enclosing the outlet of the housing.

9. The curing apparatus of claim 8, wherein the first outlet gate and the second outlet gate are sequentially operated from a closed position to an open position during movement of an article through the outlet.

10. The curing apparatus of claim 9, wherein the second outlet gate is movable to the open position when the first outlet gate is in the closed position.

11. The curing apparatus of claim 1, further comprising a filter positioned between the at least one ultraviolet radiation source and the interior chamber, wherein the filter is mounted within a frame positioned in an opening extending through the sidewall of the housing.

12. The curing apparatus of claim 1, wherein the at least one nozzle has an adjustment mechanism for adjusting a flow rate of an inert gas into the interior chamber.

13. The curing apparatus of claim 1, further comprising at least one diffuser plate disposed between the at least one nozzle and the interior chamber, the at least one diffuser plate having a plurality of gas-permeable openings configured for diffusing an inert gas into the interior chamber.

14. The curing apparatus of claim 1, further comprising a heat exchanger configured for heating or cooling at least one of the housing, an inert gas within the interior chamber of the housing, or the inert gas flowing from the at least one nozzle.

15. The curing apparatus of claim 1, further comprising at least one reflective element within the interior chamber, the at least one reflective element having an angled reflective surface configured for reflecting at least a portion of the ultraviolet radiation from the at least one ultraviolet radiation source toward a lateral side of an article.

* * * * *